United States Patent [19]

Matzner et al.

[11] Patent Number: 4,540,748

[45] Date of Patent: Sep. 10, 1985

[54] POLYETHERIMIDES

[75] Inventors: Markus Matzner, Edison, N.J.; Donald M. Papuga, Danbury, Conn.

[73] Assignee: Union Carbide Corporation, Danbury, Conn.

[21] Appl. No.: 626,102

[22] Filed: Jun. 29, 1984

[51] Int. Cl.$^3$ .................... C08G 73/10; C08G 73/14
[52] U.S. Cl. .................................. 525/420; 525/393; 525/397; 525/471; 525/534; 528/26; 528/125; 528/126; 528/128; 528/172; 528/184; 528/185
[58] Field of Search ............... 528/125, 126, 128, 172, 528/184, 185, 26; 525/420, 471, 393, 397, 534

[56] References Cited

U.S. PATENT DOCUMENTS

| | | | |
|---|---|---|---|
| 4,197,396 | 4/1980 | Banucci et al. | 528/185 |
| 4,221,897 | 9/1980 | Takekoshi | 528/185 |
| 4,332,929 | 6/1982 | Holub et al. | 528/185 |

*Primary Examiner*—Lester L. Lee
*Attorney, Agent, or Firm*—Donald M. Papuga

[57] ABSTRACT

Described herein are novel polyetherimide produced by the reaction of a dianhydride and a diamine having a molecular weight $\geq 1500$. These polyetherimides have good melt processability and a good combination of high temperature properties.

7 Claims, No Drawings

POLYETHERIMIDES

BACKGROUND OF THE INVENTION

This invention relates to a new class of polyetherimides.

U.S. Pat. Nos. 3,838,097; 3,847,867; 3,847,869; 3,905,942; 3,983,093, for example, describe polyetherimides of the formula:

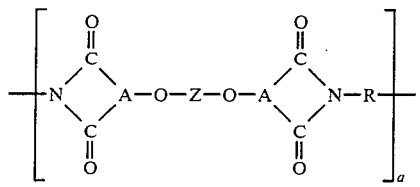

where a represents a whole number in excess of 1, e.g., 10 to 10,000 or more, the group —O—A< is selected from:

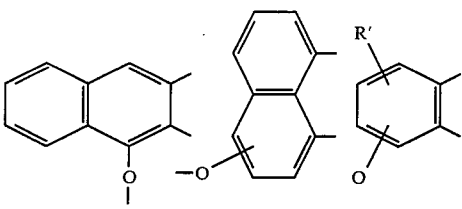

R' being hydrogen, lower alkyl or lower alkoxy, preferably the polyetherimide includes the latter —O—A< group where R' is hydrogen such that the polyetherimide is of the formula:

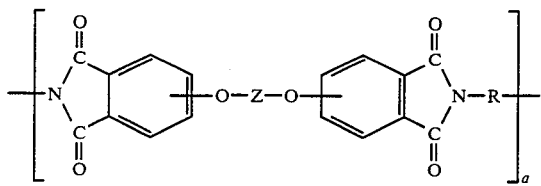

and the divalent bonds of the —O—Z—O radical are in the 3,3'; 3,4'; 4,3' or the 4,4' position. Z is a member of the class consisting of

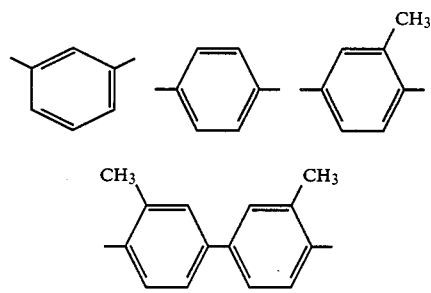

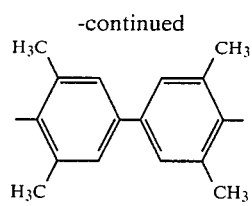

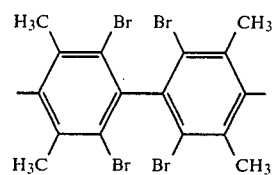

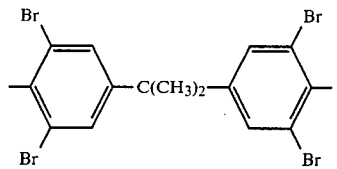

and (2) divalent organic radicals of the general formula:

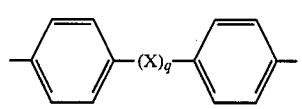

where X is a member selected from the class consisting of divalent radicals of the formulas,

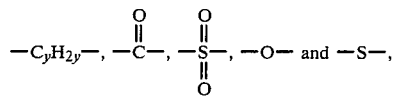

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$, alkylene terminated polydiorganosiloxane, and (3) divalent radicals included by the formula

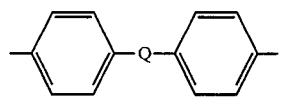

where Q is a member selected from the class consisting of

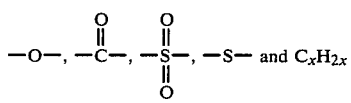

where x is a whole number from 1 to 5 inclusive. Particularly preferred polyetherimides include those where —O—A< and Z respectively are:

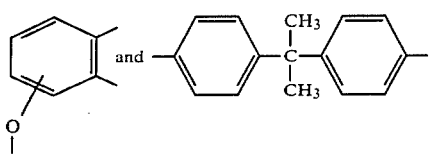

and R is selected from:

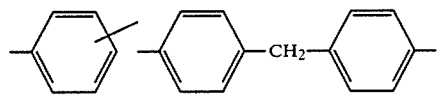

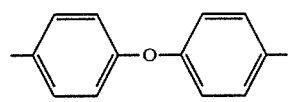

The polyetherimides where R is metaphenylene are most preferred.

One of the principal drawbacks of these polymers is their lack of good melt fabricability which severely limits their usefulness.

It was now unexpectedly found that the difficulty above is obviated by using oligomeric diamines $H_2N-R-NH_2$ wherein the molecular weight of R is $\geq 1,500$.

THE INVENTION

The polyetherimides of this invention display a unique combination of high temperature properties and excellent melt processability. They are suitable for molding, extrusion, and coatings applications. They are also of interest as components of blends, as filled materials and in composites.

The compound $H_2NRNH_2$ can be selected from the class consisting of diamino-terminated aliphatic, aliphatic aromatic, and heterocyclic polyamides. It may also be a diamino-terminated aromatic polyether or poly(ether ketone).

The diamino-terminated aliphatic polyamides.

(a) Polyamides of the general formula $H_2NR'NH-(COR^2CONHR'NH)_nCOR^2CONHR'NH_2$; made by condensation of an excess of $H_2NR'NH_2$ with $HOOCR^2COOH$. $R'$ and $R^2$ are straight chain or branched alkylene, and may be the same or different; n is an integer such that the molecular weight of the diamino-terminated oligomer is at least 1,500.

(b) Polyamides derived from the ring opening polymerization of lactams in the presence of an excess diamine $H_2NR'H_2$. Preferred lactams are materials of the formula

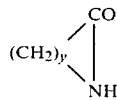

wherein y is from 3 to 11.
The oligomers are of the formula $H_2NR'NH[CO(CH_2)_xNH]_mCO(CH_2)_xNH_2$ $R'$ being as defined above.

m is such that the molecular weight is of the oligomer $\geq 1,500$.

Lactones of the formula

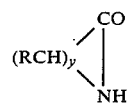

y being as defined above, R is an inert substituent, i.e. $C_1$ to $C_7$ alkyl, etc.

Other diamino-terminated polyamides include:

(c) As under (a) above wherein $R^2$ is replaced by $R^3$ which is an aromatic mono or polynuclear residue of $C_6-C_{20}$, e.g.

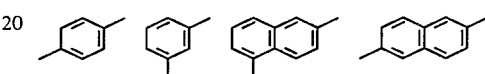

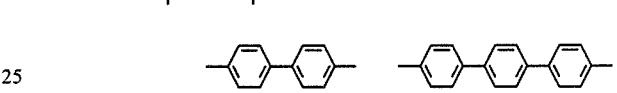

while $R'$ is as defined above under (a).

(d) As under (a) above; $R^2$ the same as under (a) and $R^3$ being used instead of $R'$. In other words the oligomer is derived form the reaction of an aromatic diamine with an aliphatic diacid.

$R'$ and/or $R^2$ may also be heterocyclic, i.e.

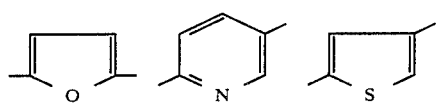

and the like.

Polyamides can be prepared using melt or interfacial techniques with excess diamine by methods well known in the art.

Another group of oligomeric diamino compounds is derived from amino-terminated poly(arylether) and poly(arylketone) polymers.

Poly(aryl ether) polymers are linear, thermoplastic polyarylene polyethers wherein the arylene units are interspersed with either ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., $-SO_2-$ or $-CO-$, between arylene groupings, to provide sulfone or ketone units in the polymer chain in addition to arylene units and ether units. The polymer has a basic structure comprising recurring units of the formula: $O-E-O-E'$ wherein E is the residuum of the dihydric phenol, and $E'$ is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, the latter, for example, being an ether oxygen (—O—),

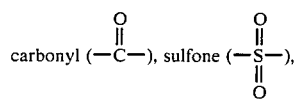

or hydrocarbon residue in which the two phenolic nuclei are joined to the same or different carbon atoms of the residue.

Such dinuclear phenols can be characterized as having the structure:

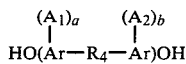

wherein Ar is an aromatic group and preferably is a phenylene group, $A_1$ and $A_2$ can be the same or different inert substituent groups such as alkyl groups having from 1 to 4 carbons atoms, halogen atoms, i.e., fluorine, chlorine, bromine or iodine, or alkoxy radicals having from 1 to 4 carbon atoms, a and b are integers having a value of from 0 to 4, inclusive, and $R_4$ is representative of a bond between aromatic carbon atoms as in a dihydroxy-diphenyl, such as 4,4', 3,3', or 4,3'-dihydroxydiphenyl; or is a divalent radical, including, for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals or an aromatic radical; it may also represent rings fused to both Ar groups.

Examples of specific dihydric polynuclear phenols include among others the bis-(hydroxyphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)1,1,1,3,3,3,-hexafluoropropane, and the like;

di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3-,dihydroxydiphenyl ethers, 4,4'-dihydroxy-2,6-dimethyldiphenyl ether,bis-(4-hydroxy-3-isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy-3-bromophenyl)ether, bis-(4-hydroxynaphthyl)ether, bis-(4-hydroxy-3-chloronaphthyl)ether, and 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through an aromatic ether oxygen atom.

Any dihalobenzenoid or dinitrobenzenoid compound or mixtures thereof can be employed which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine and chlorine substituted benzenoid reactants are preferred; the flourine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group is employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma value, as set forth in J. F. Bunnett in Chem. Rev. 49, 273 (1951) and Quart. Rev., 12, 1 (1958) See also Taft, Steric Effects in *Organic Chemistry*, John Wiley & Sons (1956), chapter 13; *Chem, Rev.,* 53, 222; JACS, 74,3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens or nitro groups on two different rings, such as the sulfone group

the carbonyl group

the vinylene group

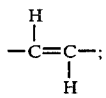

the sulfoxide group

the azo group —N=N—; the saturated fluorocarbon groups —CF$_2$CF$_2$—; organic phosphine oxides

where R$_5$ is a hydrocarbon group, and the ethylidene group

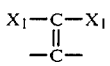

where X$_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt by the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

The polymerization reaction proceeds in the liquid phase of a sulfoxide or sulfone organic solvent at elevated temperatures. In order to obtain the high polymers, the system should be substantially anhydrous, and preferably with less than 0.5 percent by weight water in the reaction mixtures.

In another embodiment, the poly(aryl ethers) may be prepared by the high temperature condensation of the diphenol with the dihalo or dinitro aromatic compound in an inert aprotic solvent in the presence of at least equimolar amounts of an alkali or alkaline earth metal carbonate or bicarbonate. Preferably, mixtures of potassium carbonate with sodium carbonate are used. N-methylpyrrolidone, dimethyl sulfoxide, sulfolane, dimethylacetamide and diphenyl sulfone are preferred solvents.

A preferred form of the polyarylene polyethers of this invention are those prepared using the dihydric polynuclear phenols of the following types, including the derivatives thereof which are substituted with inert substituent groups on the aromatic nuclei:

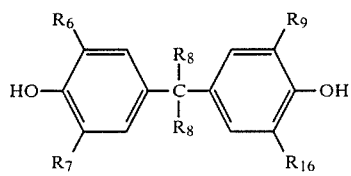

in which the R$_6$, R$_7$, R$_8$, R$_9$, R$_{10}$ groups represent independently hydrogen, lower alkyl, aryl and the halogen substituted groups thereof, which can be the same or different; the compound with R$_8$=CH$_3$ being preferred: examples include biphenol-A and

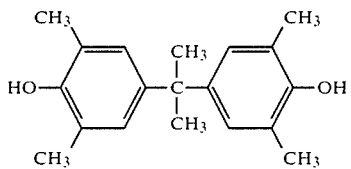

other preferred bisphenols being:

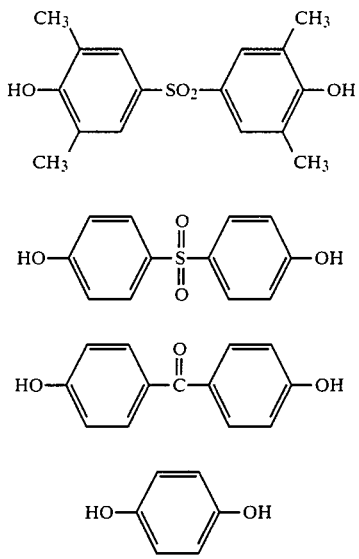

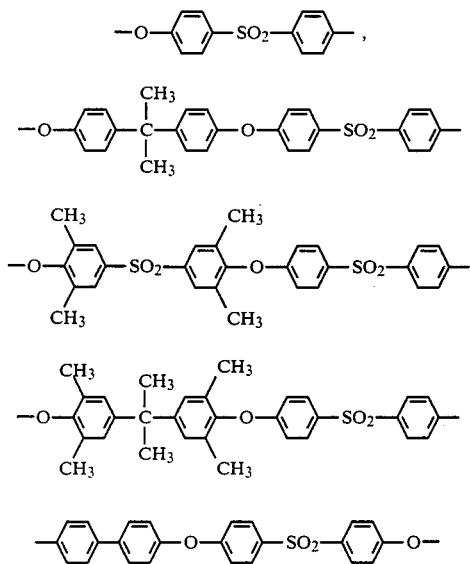

and nuclearly substituted derivatives of all of the above.

It is also contemplated in this invention to use a mixture of two or more different dihydric phenols to accomplish the same ends as above. Thus when referred to above the —E— residuum in the polymer structure can actually be the same or different aromatic residua.

The preferred poly(aryl ether)s have repeating units of the formula:

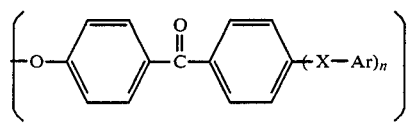

The poly(aryl ketone)s which are suitable for use herein can be generically characterized as containing repeating units of the following formula:

wherein Ar is independently a divalent aromatic radical selected from phenylene, biphenylene or naphthylene, X is independently O, $$\overset{O}{\underset{\|}{C,}}$$

or a direct bond and n is an integer of from 0 to 3.

The most preferred poly(aryl ketone)s have repeating units of the formula:

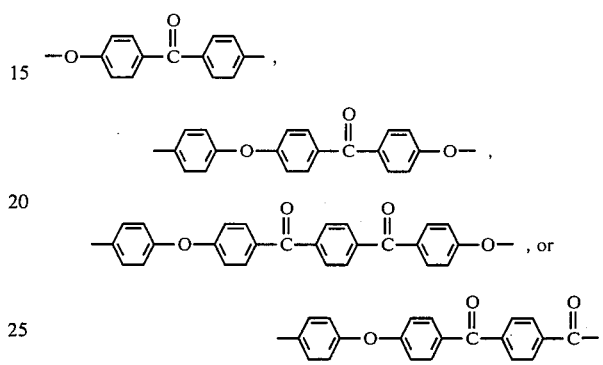

These poly(aryl ketone)s are prepared by methods well known in the art, such as by heating a substantially equimolar mixture of at least one bisphenol and at least one dihalobenzoid compound or at least one halophenol compound in the presence of base, preferably in an apiotic solvent. Preferred bisphenols include:
hydroquinone,
4,4'-dihydroxybenzophenone,
4,4'-dihydroxybiphenyl,
4,4'-dihydroxydiphenyl ether and
2,2'-bis(4-hydroxyphenyl)propane.

Preferred dihalo and halophenol compounds include:
4-(4-chlorobenzoyl)phenol,
4,4'-difluorobenzophenone,
4,4'-dichlorobenzophenone,
4-chloro-4'-fluorobenzophenone,

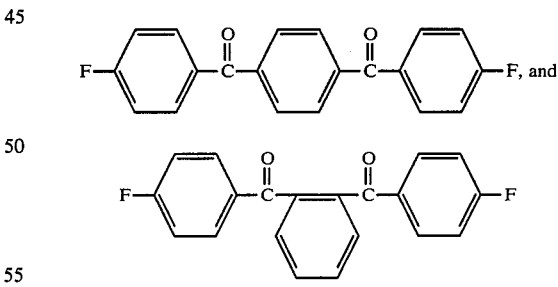

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzoid compound, or (ii) at least one halophenol, in which in the dihalobenzenoid compound or halophenol, the halogen atoms are activated by —CO— groups ortho or para thereto, with a mixture of sodium carbonate or bicarbonate and optionally a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

The term poly(arylketone) is meant to include homopolymers, copolymers, and terpolymers.

The diamino compounds useful in the present invention are obtained from dihalo or dinitro-terminated, low molecular weight poly(arylethers) and/or poly(arylketones). The preparation of the latter is conducted using an appropriate excess of the dihalo or dinitro reactant and following the general procedures outlined above.

The low-molecular weight dihalo or dinitro terminated oligomer represented by the formula

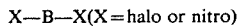

X—B—X(X=halo or nitro)

wherein B is a poly(arylether) and/or poly(arylketone) as defined above is reacted under conditions used for its preparation with a compound of the general formula

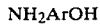

NH₂ArOH wherein Ar is an aryl $C_1$ to $C_{20}$ optionally substituted with an inert group, i.e. $C_1$ to $C_7$ alkyl, cycloalkyl of $C_5$ to $C_{12}$, or halogen. Preferred H₂NArOH are

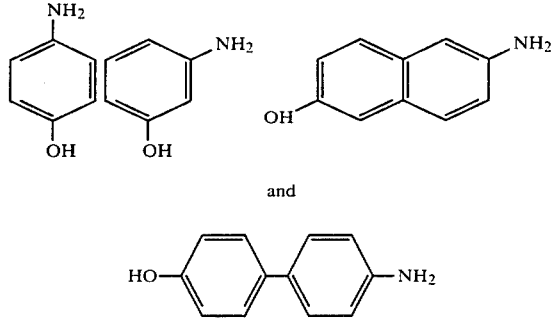

and

The resulting product is the oligomeric diamine

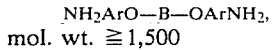

NH₂ArO—B—OArNH₂,
mol. wt. ≧1,500 useful in this invention.

The preferred materials of the present invention are those poly(etherimides) that are based on the diamines

NH₂ArOBOArNH₂ wherein Ar is

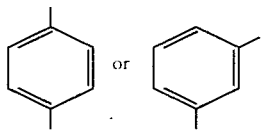

and B is an oligomer corresponding to the formulae of the preferred poly(arylethers) and poly(arylketones) listed previously. The preparation of the novel polyetherimides is conducted using methods known in the art.

The polyetherimides can be obtained by any of the methods well known to those skilled in the art including the reaction of any aromatic bis(ether anhydrides) of the formula

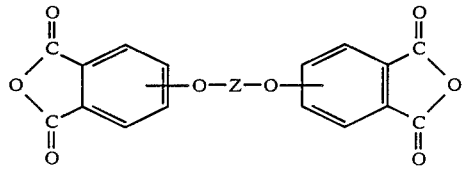

where Z is as defined hereinbefore with the organic diamine

H₂N—R—NH₂ where R is an oligomeric residue as defined hereinbefore.

Aromatic bis(ether anhydride)s of the above formula include, for example,
2,2-bis[4-(2,3-dicarboxyphenoxy)phenyl]-propane dianhydride; 4,4′-bis(2,3-dicarboxyphenoxy)diphenyl ether dianhydride;
1,3-bis(2,3-dicarboxyphenoxy)benzene dianhydride;
4,4′-bis(2,3-dicarboxyphenoxy)diphenyl sulfide dianhydride; 1,4-bis(2,3-dicarboxyphenoxy)benzene dianhydride;
4,4′-bis(2,3-dicarboxyphenoxy)benzophenone dianhydride; 4,4′-bis(2,3-dicarboxyphenoxy)diphenyl sulfone dianhydride;
2,2-bis[4-(3,4-dicarboxyphenoxy)phenyl]propane dianhydride; 4,4′-bis(3,4-dicarboxyphenoxy)diphenyl ether dianhydride;
4,4′-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride;
4,4′-bis(3,4-dicarboxyphenoxy)benzophenone dianhydride;
4-(2,3-dicarboxyphenoxy)-4,(3,4-dicarboxyphenoxy)-diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic compounds, Academy of Sciences, U.S.S.R.), U.S.S.R. 257,010, Nov. 11, 1969, Appl. May 3, 1967. In addition, dianhydrides are shown by M. M. Koton, F. S. Florinski, Zh Org. Khin. 4(5), 774 (1968).

Mixtures of monomeric and oligomeric diamides are also useful.

In general, the reactions can be advantageously carried out employing well-known solvents, e.g., o-dichlorobenzene, m-cresol/toluene, etc. in which to effect interaction between the dianhydrides and the diamines, at temperatures of from about 100° to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general equimolar amounts of diamine and dianhydride are employed for high molecular weight polyetherimides, however, in certain instances, a slight molar excess (about 1 to 5 mol percent-)of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in Heath et al., U.S. Pat. No. 3,847,867, Williams U.S. Pat. No. 3,847,869, Takekoshi et al. U.S. Pat. No. 3,850,885, White U.S. Pat. Nos. 3,852,242 and 3,855,178, etc. These disclosures are incorporated herein in their entirety by reference for the purpose of teaching, by way of illustration, general and specific methods of preparing polyetherimides suitable for the polymers of this invention.

EXAMPLES

The following examples serve to give specific illustrations of the practice of this invention but they are not intended in any way to limit the scope of this invention.

EXAMPLE 1

In this series of experiments the diamine, mol. wt. about 3,000 is being used

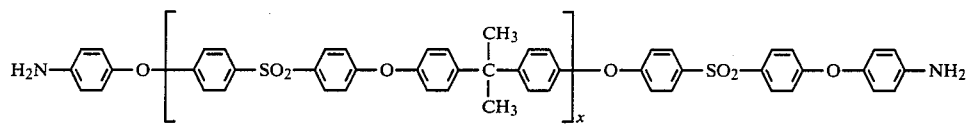

x=6.03

It is condensed with the dianhydride having the formula

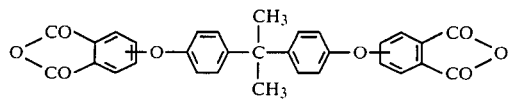

A mixture of 2,2-bis[4-(3,4-dicarboxyphenoxy)phenyl]propane dianhydride (5.2 parts, 0.01 mole), 30 gms (0.01 mole) of the diamine and 70 wt. of dimethylacetamide is stirred at ambient temperature for 4 hrs. under nitrogen atmosphere. The DMAC solution is divided into two parts. A filler is cast from one portion; the solvent is evaporated and the flexible film is cured at ∼280° C. for 3 hrs. It is slightly brown and very tough.

The second portion of the DMAC solution is stirred under vacuum; the residue left after solvent evaporation is progressively heated to about 270°–290° C. (1 hr.) and kept at that temperature for about two hours. A tough polymer is obtained.

The reactants above are also made to react in the melt and yield similarly materials having excellent properties.

EXAMPLE 2

The diamine

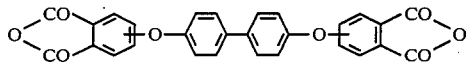

x=10.72, mol. wt. ∼5,000 is reacted with the dianhydride

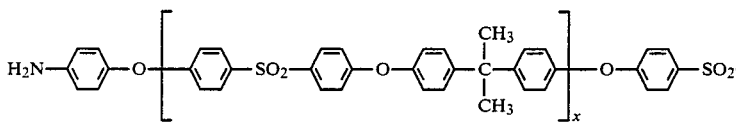

in the melt. The amounts used are 50 gms (0.01 mole) of the diamine and 4.8 gms (0.01 mole) of the dianhydride. A tough, light brown material is obtained.

EXAMPLE 3

In a manner similar to the above the diamino compounds shown below are used.

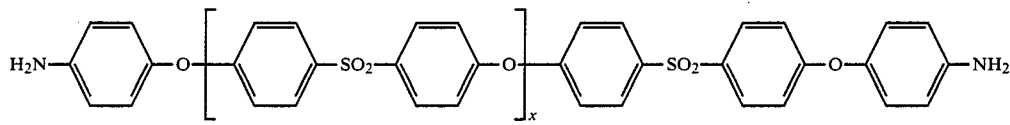

x=11.07, mol. wt.=3,000

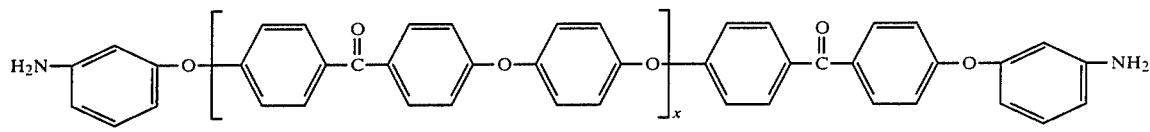

x=5.57, mol. wt.=2,000 yielding materials that display excellent properties.

EXAMPLE 4

The two dianhydrides above are reacted with diamino-terminated
nylon 6,6
nylon 6
nylon 6,10 and
the polyamide made from an excess of 2,4,4-trimethyl-hexamethylene diamine and isophthalic acid.
All of the oligomers have molecular weights of about 2,500.

The materials obtained with the nylons are flexible and have acceptable mechanical properties. The aliphatic-aromatic polyamide yields a clear, transparent polymer with very good mechanicals.

The polymer of Example 1 is also prepared by an alternate route in which nitrophthalic anhydride is first condensed with the diamine

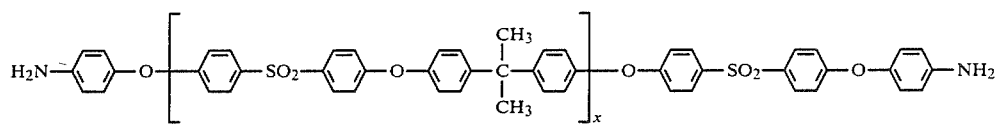

under conditions similar to those described in U.S. Pat. No. 3,852,242; the dinitro compound is then condensed with the disodium salt of bisphenol-A and yields the final polymer.

We claim:

1. A polyetherimide produced by the reaction of a dianhydride of the formula:

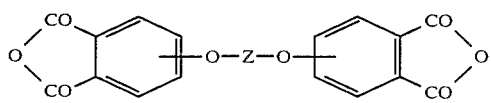

wherein Z is a member of the class consisting of

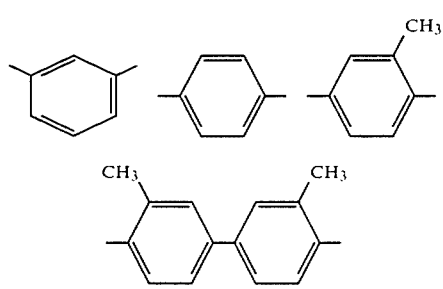

-continued

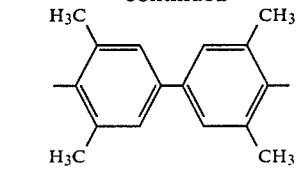

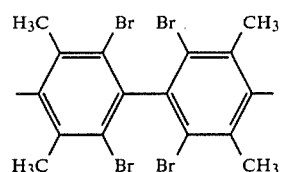

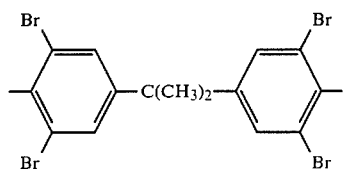

and (2) divalent organic radicals of the general formula:

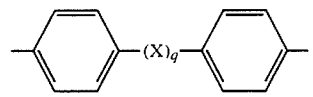

where X is a member selected from the class consisting of divalent radicals of the formulas,

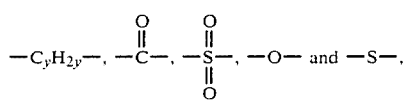

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$, alkylene terminated polydiorganosiloxane, and (3) divalent radicals included by the formula

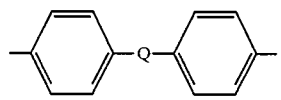

where Q is a member selected from the class consisting of

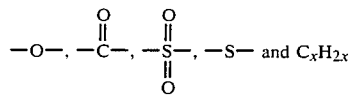

where x is a whole number from 1 to 5 inclusive, and a diamine of the formula:

$$H_2N-R-NH_2$$

wherein R is an aliphatic polyamide, aliphatic aromatic polyamide, heterocyclic polyamide, aromatic polyether or poly(ether ketone) having a molecular weight $\geq 1500$.

2. A polyetherimide as defined in claim 1 wherein the diamine is of the formula: $H_2NR'NH—(COR^2CONHR'NH)_nCOR^2CONHR'NH_2$ wherein R' and $R^2$ are straight chain or branched alkylene, and may be the same or different; n is an integer such that the molecular weight of the diamino-terminated oligomer is at least 1,500.

3. A polyetherimide as defined in claim 1 wherein the diamine is of the formula:

$$H_2NR'NH[CO(CH_2)_xNH]_mCO(CH_2)_xNH_2$$

R' being as defined in claim 2 and m is such that the molecular weight is $\geq 1,500$.

4. A polyetherimide as defined in claim 1 wherein the diamine is of the following formula:

$$H_2NR'NH—(COR^3CONHR'NH)_nCOR^3CONHR'NH_2$$

$R^3$ is an aromatic mono or polynuclear residue of $C_6-C_{20}$ and R' and n are as defined in claim 2.

5. A polyetherimide as defined in claim 1 wherein the diamine is of the following formula:

$$H_2NR_3NH—(COR^2CONHR_3NH)_nCOR^2CONR_3NH_2$$

wherein $R^2$ and n are as defined in claim 2 and $R^3$ is as defined in claim 4.

6. A polyetherimide as defined in claim 1 wherein the diamine is an amino-terminated poly(aryl ether).

7. A polyetherimide as defined in claim 1 wherein the diamine is an amino-terminated poly(aryl ketone).

* * * * *